UNITED STATES PATENT OFFICE.

GEORGE A. TURNBULL, OF CHICAGO, ILLINOIS.

COMPOSITION OF MATTER FOR ROOFING.

SPECIFICATION forming part of Letters Patent No. 503,336, dated August 15, 1893.

Application filed September 7, 1892. Serial No. 445,258. (No specimens.)

*To all whom it may concern:*

Be it known that I, GEORGE A. TURNBULL, a citizen of the United States, residing at Chicago, in the county of Cook and State of Illinois, have invented a new and useful Compound, of which the following is a specification.

My invention relates to compound for roofing, and the object is to provide a compound which will be sufficiently hard and elastic and to be easily applied and to resist the elements and the ordinary changes of the temperature, the principal object being to provide a composition or compound to be mixed with tar and land plaster to give the proper temper and to make it practically fire proof, as it were, to the compound. This object I attain by a composition composed of the following materials mixed together in convenient form to be introduced into the tar and land plaster when heated, so as to unite and form a compound which, when cool, will be of the requisite temper, the mixture being in proportion given, viz: gypsum, three-eighths ($\frac{3}{8}$); plaster of paris, one-eighth ($\frac{1}{8}$); powdered salt, one-fourth ($\frac{1}{4}$); flowers of sulphur, one-fourth ($\frac{1}{4}$). These several ingredients, in powdered form, and in about the proportions above given, are uniformly mixed so as to constitute a mass, in which each of the ingredients forms an indistinguishable part, the mass being kept in any convenient form so that it can be put into the heater when the tar composition is melted for use, using about one gallon, dry measure, to twenty-five (25) gallons of the tar composition, thoroughly stirring until the same is well distributed throughout the entire mass of melted tar. This applied in the usual way, will neither crack nor break under the influence of low temperature, nor melt, nor run under the heat of the sun, as the ordinary roofing composition is liable to do.

What I claim, and desire to secure by Letters Patent, is—

A tempering fire-proof mixture for roofing material, consisting of gypsum, plaster of paris, powdered salt, and flowers of sulphur, in about the proportions specified.

GEORGE A. TURNBULL.

Witnesses:
NEWTON MORGANROTH,
A. J. REDMOND.